(12) United States Patent
Leabman

(10) Patent No.: US 9,438,046 B1
(45) Date of Patent: Sep. 6, 2016

(54) METHODS AND SYSTEMS FOR MAXIMUM POWER POINT TRANSFER IN RECEIVERS

(71) Applicant: ENERGOUS CORPORATION, San Jose, CA (US)

(72) Inventor: Michael Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 14/747,995

(22) Filed: Jun. 23, 2015

Related U.S. Application Data

(63) Continuation of application No. 14/584,869, filed on Dec. 29, 2014, which is a continuation-in-part of application No. 14/272,207, filed on May 7, 2014, now abandoned.

(51) Int. Cl.
| | | |
|---|---|---|
| H01F 27/42 | (2006.01) | |
| H01F 37/00 | (2006.01) | |
| H01F 38/00 | (2006.01) | |
| H02J 5/00 | (2016.01) | |

(52) U.S. Cl.
CPC ...................................... *H02J 5/005* (2013.01)

(58) Field of Classification Search
USPC ........................... 307/104; 320/101; 455/572
See application file for complete search history.

(56) References Cited

U.S. PATENT DOCUMENTS

| | | | |
|---|---|---|---|
| 4,360,741 A | 11/1982 | Fitzsimmons et al. | |
| 5,712,642 A | 1/1998 | Hulderman | |
| 5,936,527 A | 8/1999 | Isaacman et al. | |
| 5,982,139 A | 11/1999 | Parise | |
| 6,127,799 A | 10/2000 | Krishnan | |
| 6,127,942 A | 10/2000 | Welle | |
| 6,289,237 B1 | 9/2001 | Mickle et al. | |
| 6,615,074 B2 | 9/2003 | Mickle et al. | |
| 6,798,716 B1 | 9/2004 | Charych | |
| 6,856,291 B2 | 2/2005 | Mickle et al. | |
| 6,960,968 B2 | 11/2005 | Odendaal et al. | |
| 7,003,350 B2 | 2/2006 | Denker et al. | |
| 7,027,311 B2 | 4/2006 | Vanderelli et al. | |

(Continued)

FOREIGN PATENT DOCUMENTS

| | | | |
|---|---|---|---|
| EP | 2545635 | | 9/2011 |
| KR | WO 2004077550 | * | 9/2004 |

(Continued)

OTHER PUBLICATIONS

International Search Report dated Sep. 12, 2014 corresponding to International Patent Application No. PCT/US2014/037072, 3 pages.

(Continued)

*Primary Examiner* — Rexford Barnie
*Assistant Examiner* — Xuan Ly
(74) *Attorney, Agent, or Firm* — Eric L. Sophir; Dentons US LLP

(57) ABSTRACT

A MPPT management method in a receiver used for wireless power transmission may include the monitoring of the power extracted from RF waves at a dedicated antenna element in the receiver; detecting MPPT at an intelligent input boost converter in the receiver; comparing the detected MPPT with MPPT tables stored or calculated within a main system micro-controller in the receiver; adjusting the MPPT at the intelligent boost converter to find a suitable maximum peak that may enable an optimal power extraction from RF waves.

20 Claims, 5 Drawing Sheets

(56) References Cited

U.S. PATENT DOCUMENTS

| | | | |
|---|---|---|---|
| 7,068,991 B2 | 6/2006 | Parise | |
| 7,191,013 B1 | 3/2007 | Miranda et al. | |
| 7,403,803 B2 | 7/2008 | Mickle et al. | |
| 7,451,839 B2 | 11/2008 | Perlman | |
| 7,639,994 B2 | 12/2009 | Greene et al. | |
| 7,643,312 B2 | 1/2010 | Vanderelli et al. | |
| 7,786,419 B2 | 8/2010 | Hyde et al. | |
| 7,812,771 B2 | 10/2010 | Greene et al. | |
| 7,844,306 B2 | 11/2010 | Shearer et al. | |
| 7,868,482 B2 | 1/2011 | Greene et al. | |
| 7,898,105 B2 | 3/2011 | Greene et al. | |
| 7,925,308 B2 | 4/2011 | Greene et al. | |
| 8,099,140 B2 | 1/2012 | Arai | |
| 8,115,448 B2 | 2/2012 | John | |
| 8,159,090 B2 | 4/2012 | Greene et al. | |
| 8,159,364 B2 | 4/2012 | Zeine | |
| 8,180,286 B2 | 5/2012 | Yamasuge | |
| 8,362,745 B2 * | 1/2013 | Tinaphong | H02J 17/00 320/101 |
| 8,380,255 B2 | 2/2013 | Shearer et al. | |
| 8,410,953 B2 | 4/2013 | Zeine | |
| 8,432,062 B2 | 4/2013 | Greene et al. | |
| 8,432,071 B2 | 4/2013 | Huang et al. | |
| 8,446,248 B2 | 5/2013 | Zeine | |
| 8,447,234 B2 | 5/2013 | Cook et al. | |
| 8,461,817 B2 * | 6/2013 | Martin | H02J 17/00 323/282 |
| 8,552,597 B2 | 10/2013 | Song et al. | |
| 8,558,661 B2 | 10/2013 | Zeine | |
| 8,621,245 B2 | 12/2013 | Shearer et al. | |
| 8,854,176 B2 | 10/2014 | Zeine | |
| 8,897,770 B1 | 11/2014 | Frolov et al. | |
| 9,000,616 B2 | 4/2015 | Greene et al. | |
| 9,021,277 B2 | 4/2015 | Shearer et al. | |
| 2003/0179573 A1 | 9/2003 | Chun | |
| 2005/0007276 A1 | 1/2005 | Barrick et al. | |
| 2006/0238365 A1 | 10/2006 | Vecchione et al. | |
| 2006/0284593 A1 | 12/2006 | Nagy et al. | |
| 2007/0007821 A1 | 1/2007 | Rossetti | |
| 2007/0060185 A1 | 3/2007 | Simon et al. | |
| 2007/0178945 A1 * | 8/2007 | Cook | H02J 17/00 455/572 |
| 2007/0191075 A1 | 8/2007 | Greene et al. | |
| 2008/0309452 A1 | 12/2008 | Zeine | |
| 2009/0067208 A1 | 3/2009 | Martin et al. | |
| 2009/0200985 A1 | 8/2009 | Zane et al. | |
| 2009/0243397 A1 | 10/2009 | Cook et al. | |
| 2010/0027379 A1 | 2/2010 | Saulnier et al. | |
| 2010/0033021 A1 | 2/2010 | Bennett | |
| 2010/0194206 A1 | 8/2010 | Burdo et al. | |
| 2010/0201201 A1 | 8/2010 | Mobarhan et al. | |
| 2010/0244576 A1 | 9/2010 | Hillan et al. | |
| 2010/0277003 A1 * | 11/2010 | Von Novak | H02J 17/00 307/104 |
| 2010/0295372 A1 | 11/2010 | Hyde et al. | |
| 2010/0309079 A1 | 12/2010 | Rofougaran et al. | |
| 2010/0315045 A1 | 12/2010 | Zeine | |
| 2011/0074342 A1 | 3/2011 | MacLaughlin | |
| 2011/0115303 A1 | 5/2011 | Baarman et al. | |
| 2011/0181120 A1 | 7/2011 | Liu et al. | |
| 2011/0199046 A1 * | 8/2011 | Tsai et al. | 320/108 |
| 2011/0254503 A1 | 10/2011 | Widmer et al. | |
| 2011/0281535 A1 | 11/2011 | Low et al. | |
| 2011/0282415 A1 | 11/2011 | Eckhoff et al. | |
| 2012/0080957 A1 | 4/2012 | Cooper et al. | |
| 2012/0146576 A1 | 6/2012 | Partovi | |
| 2012/0157019 A1 | 6/2012 | Li | |
| 2012/0193999 A1 | 8/2012 | Zeine | |
| 2012/0248891 A1 | 10/2012 | Drennen | |
| 2012/0274154 A1 | 11/2012 | DeLuca | |
| 2012/0293021 A1 | 11/2012 | Teggatz et al. | |
| 2012/0299540 A1 | 11/2012 | Perry | |
| 2012/0299541 A1 | 11/2012 | Perry | |
| 2012/0299542 A1 | 11/2012 | Perry | |
| 2012/0300588 A1 | 11/2012 | Perry | |
| 2012/0300592 A1 | 11/2012 | Perry | |
| 2012/0300593 A1 | 11/2012 | Perry | |
| 2012/0326660 A1 | 12/2012 | Lu et al. | |
| 2013/0024059 A1 | 1/2013 | Miller et al. | |
| 2013/0026982 A1 | 1/2013 | Rothenbaum | |
| 2013/0207604 A1 | 8/2013 | Zeine | |
| 2013/0241468 A1 | 9/2013 | Moshfeghi | |
| 2013/0241474 A1 | 9/2013 | Moshfeghi | |
| 2014/0008992 A1 | 1/2014 | Leabman | |
| 2014/0008993 A1 | 1/2014 | Leabman | |
| 2014/0035524 A1 | 2/2014 | Zeine | |
| 2014/0049422 A1 | 2/2014 | Von Novak et al. | |
| 2014/0062395 A1 | 3/2014 | Kwon et al. | |
| 2014/0217967 A1 | 8/2014 | Zeine et al. | |
| 2014/0241231 A1 | 8/2014 | Zeine | |
| 2014/0265725 A1 | 9/2014 | Angle et al. | |
| 2014/0265727 A1 | 9/2014 | Berte | |
| 2014/0265943 A1 | 9/2014 | Angle et al. | |
| 2014/0281655 A1 | 9/2014 | Angle et al. | |
| 2014/0354063 A1 | 12/2014 | Leabman et al. | |
| 2014/0354221 A1 | 12/2014 | Leabman et al. | |
| 2014/0368048 A1 | 12/2014 | Leabman et al. | |
| 2014/0375255 A1 | 12/2014 | Leabman et al. | |
| 2015/0015194 A1 | 1/2015 | Leabman et al. | |
| 2015/0015195 A1 | 1/2015 | Leabman et al. | |
| 2015/0022010 A1 | 1/2015 | Leabman et al. | |
| 2015/0102681 A1 | 4/2015 | Leabman et al. | |
| 2015/0102769 A1 | 4/2015 | Leabman et al. | |
| 2015/0130285 A1 | 5/2015 | Leabman et al. | |
| 2015/0199665 A1 | 7/2015 | Chu | |

FOREIGN PATENT DOCUMENTS

| | | |
|---|---|---|
| KR | 1020130026977 A | 3/2013 |
| WO | 9952173 A2 | 10/1999 |
| WO | 03091943 A1 | 11/2003 |
| WO | 2004077550 A1 | 9/2004 |
| WO | 2008156571 A2 | 12/2008 |
| WO | 2010022181 A1 | 2/2010 |
| WO | 2011112022 A2 | 9/2011 |
| WO | 2013035190 A1 | 3/2013 |

OTHER PUBLICATIONS

International Search Report dated Jan. 27, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.

* cited by examiner

METHODS AND SYSTEMS FOR MAXIMUM POWER POINT TRANSFER IN RECEIVERS

CROSS-REFERENCE TO RELATED APPLICATIONS

This application is a continuation of U.S. patent application Ser. No. 14/584,869, filed on Dec. 29, 2014, which is a continuation-in-part of U.S. patent application Ser. No. 14/272,207, filed on May 7, 2014, which are herein fully incorporated by reference in their entirety.

This application is related to U.S. patent application Ser. No. 13/891,430, filed on May 10, 2013; U.S. patent application Ser. No. 13/946,082, filed on Jul. 19, 2013; U.S. patent application Ser. No. 13/891,399, filed on May 10, 2013; U.S. patent application Ser. No. 13/891,445, filed on May 10, 2013; and U.S. patent application Ser. No. 14/272,179, filed on May 7, 2014; U.S. Non-Provisional patent application Ser. No. 14/583,625, filed Dec. 27, 2014, entitled "Receivers for Wireless Power Transmission," U.S. Non-Provisional patent application Ser. No. 14/583,630, filed Dec. 27, 2014, entitled "Methodology for Pocket-Forming," U.S. Non-Provisional patent application Ser. No. 14/583,634, filed Dec. 27, 2014, entitled "Transmitters for Wireless Power Transmission," U.S. Non-Provisional patent application Ser. No. 14/583,640, filed Dec. 27, 2014, entitled "Methodology for Multiple Pocket-Forming," U.S. Non-Provisional patent application Ser. No. 14/583,641, filed Dec. 27, 2014, entitled "Wireless Power Transmission with Selective Range," U.S. Non-Provisional patent application Ser. No. 14/583,643, filed Dec. 27, 2014, entitled "Method for 3 Dimensional Pocket-Forming," all of which are incorporated herein by reference in their entirety.

FIELD OF THE DISCLOSURE

The present disclosure generally relates to wireless power transmission, and more specifically to a MPPT management method to effectively improve power extraction in receivers.

BACKGROUND

Wireless power transmission may be based on the extraction and conversion of power or energy from transmitted RF waves. One challenge that may be present during wireless power transmission is that power or energy extracted from RF waves may be variable due to inherent characteristics of the medium and environment. Moreover, the power that can be extracted from RF waves may be zero at some instances of the wireless power transmission. The variability of the power extracted from RF waves may be fueled by interference produced by electronic devices, walls, metallic objects, and electromagnetic signals, among others.

In order to extract suitable power from RF waves, it may be desirable that a receiver may work as close as possible to maximum points or peaks, despite the fact that external conditions may alter the transmission of RF waves.

According to the foregoing, there may be a need to provide a method and/or system for managing maximum power point tracking (MPPT) in a receiver capable of operating with a variable power source derived from RF waves for powering and/or charging the batteries for a plurality of electronic devices.

SUMMARY

The present disclosure provides an MPPT management method for enabling a receiver to extract maximum power from RF waves.

The receiver may include components that may be required for the efficient wireless power transmission. In one embodiment, the receiver system may include an intelligent input boost converter with a built-in micro-controller operatively coupled with a main micro-controller to deliver continuous and suitable power or voltage to a load. The receiver may also include a dedicated antenna for measuring the power received from RF waves.

According to the disclosed MPPT management method, the built-in micro-controller in the input boost converter may monitor the voltage levels received at the main antenna array. Consequently, the built-in micro-controller may detect the maximum power point by increasing or decreasing the current it is taking from the main antenna array until it has found a local power maximum. The built-in micro-controller in the intelligent input boost converter may send this MPPT data to the main system micro-controller, which may compare the measured MPPT data with MPPT tables residing in the memory of main system micro-controller or use it for further computation in algorithms located within the software of the main system micro-controller. The result from the tables or algorithms may be used for adjusting the MPPT executed in the intelligent input boost converter for maximizing power extraction from received RF waves.

Numerous other aspects, features, and benefits of the present disclosure may be made apparent from the following detailed description taken together with the drawing figures, which may illustrate the embodiments of the present disclosure, incorporated herein for reference.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
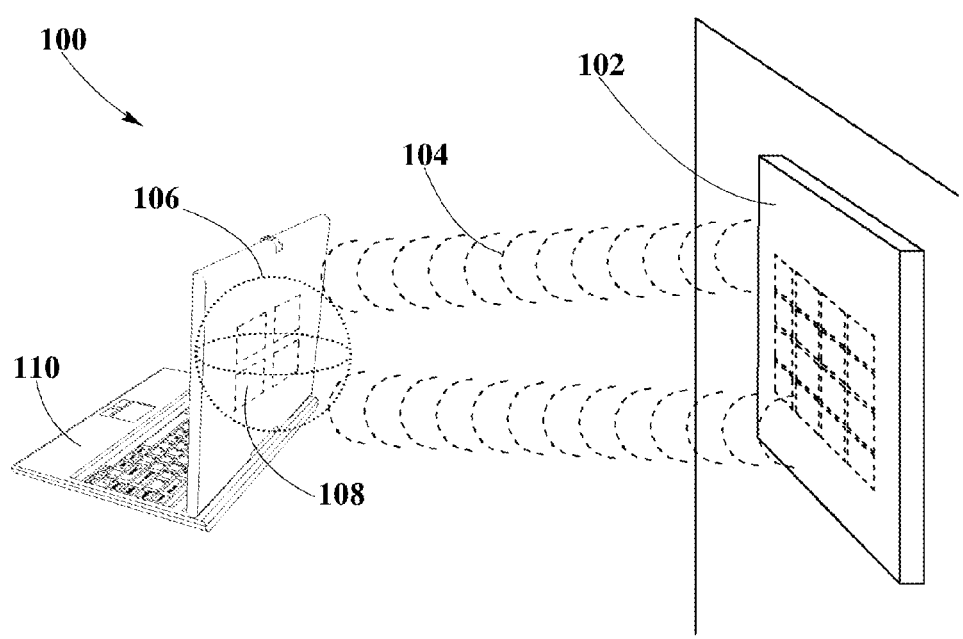
FIG. 1 illustrates wireless power transmission using pocket forming, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Pocket-forming" refers to generating two or more RF waves that converge in 3-d space, forming controlled constructive and destructive interference patterns.

"Pockets of energy" refers to areas or regions of space where energy or power may accumulate in the form of constructive interference patterns of RF waves.

"Transmitter" refers to a device, including a chip which may generate two or more RF signals, at least one RF signal being phase shifted and gain adjusted with respect to other RF signals, substantially all of which pass through one or more RF antenna such that focused RF signals are directed to a target.

"Receiver" refers to a device which may include at least one antenna, at least one rectifying circuit, at least one input boost converter, at least one storage element, at least one output boost converter, at least one switch, and at least one communication subsystem for powering or charging an electronic device using RF waves.

"MPPT or Maximum Power Point Tracking" refers to an algorithm included in micro-controllers of a receiver for extracting maximum available power from RF waves.

FIG. 1 illustrates a wireless power transmission 100 using pocket-forming. A transmitter 102 may transmit controlled Radio Frequency (RF) waves, which may converge in 3-d space. These RF waves 104 may be controlled through phase and/or relative amplitude adjustments to form constructive and destructive interference patterns (pocket-forming). Pockets of energy 106 may be formed at constructive interference patterns and can be 3-dimensional in shape, while null-spaces may be generated at destructive interference patterns. A receiver 108 may then utilize pockets of energy 106 produced by pocket-forming for charging or powering a cordless electronic device 110, for example, a smartphone, a tablet, a laptop computer (as shown in FIG. 1), a music player, an electronic toy, and the like. In some embodiments, there can be multiple transmitters 102 and/or multiple receivers 108 for powering various electronic devices 110 at the same time. In other embodiments, adaptive pocket-forming may be used to regulate the power transmitted to electronic devices 110.

Figure 2:
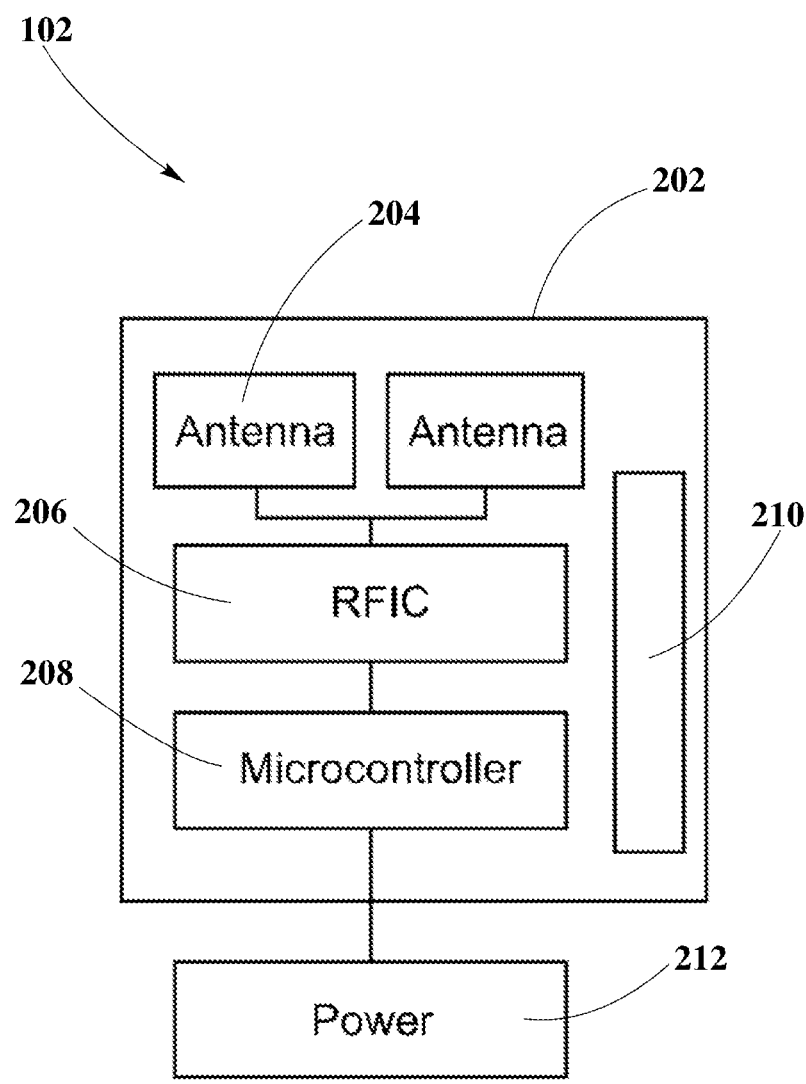
FIG. 2 illustrates a block diagram of a wireless power transmitter, which may be used in wireless power transmission, according to an embodiment.

FIG. 2 illustrates the block diagram of transmitter 102, which may be used in wireless power transmission 100. Transmitter 102 may include a housing 202, at least two or more antenna elements 204, at least one RF integrated circuit (RFIC) 206, at least one digital signal processor (DSP) or micro-controller 208, and one communications component 210. Housing 202 can be made of any suitable material which may allow for signal or wave transmission and/or reception, for example plastic or hard rubber. Antenna elements 204 may include suitable antenna types for operating in frequency bands such as 900 MHz, 2.5 GHz or 5.8 GHz as these frequency bands conform to Federal Communications Commission (FCC) regulations part 18 (Industrial, Scientific and Medical equipment). Antenna elements 204 may include vertical or horizontal polarization, right hand or left hand polarization, elliptical polarization, or other suitable polarizations as well as suitable polarization combinations. Suitable antenna types may include, for example, patch antennas with heights from about ⅛ inch to about 8 inches and widths from about ⅛ inch to about 6 inches. Other antenna elements 204 types that can be used include meta-materials based antennas, dipole antennas, and planar inverted-F antennas (PIFAs), among others.

RF integrated circuit (RFIC) 206 may include a proprietary chip for adjusting phases and/or relative magnitudes of RF signals, which may serve as inputs for antenna elements 204 for controlling pocket-forming. These RF signals may be produced using a power source 212 and a local oscillator chip (not shown) using a suitable piezoelectric material. Micro-controller 208 may then process information sent by receiver 108 through communications component 210 for determining optimum times and locations for pocket-forming. Communications component 210 may be based on standard wireless communication protocols, which may include Bluetooth, Wi-Fi or ZigBee. In addition, communications component 210 may be used to transfer other information such as an identifier for the device or user, battery level, location or other such information. Other communications component 210 may be possible, including radar, infrared cameras or sound devices for sonic triangulation of electronic device 110 position.

Figure 3:
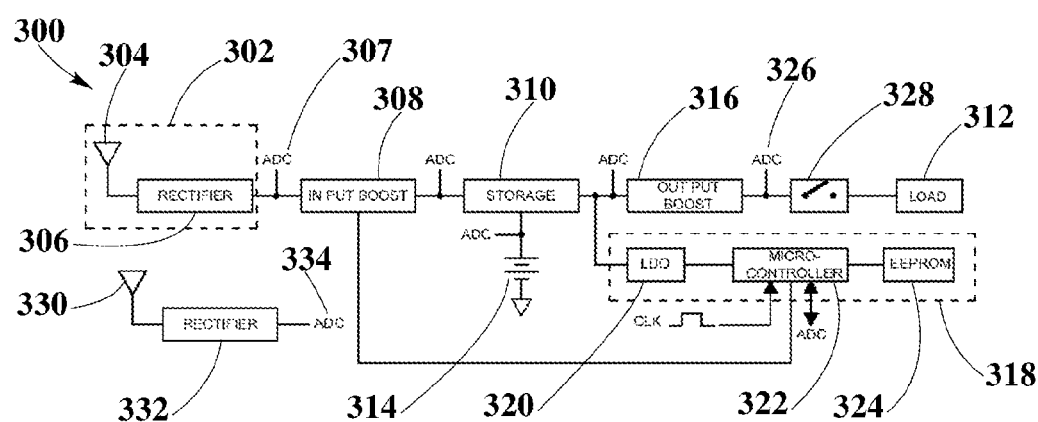
FIG. 3 depicts a block diagram of wireless power receiver configuration that may be used for extracting and converting power from transmitted RF waves, according to an embodiment.

FIG. 3 shows a block diagram of receiver configuration 300 which can be used for wireless powering or charging one or more electronic devices 110 as exemplified in wireless power transmission 100. According to some aspects of this embodiment, receiver 108 may operate with the variable power source generated from transmitted RF waves 104 to deliver constant and stable power or energy to electronic device 110. In addition, receiver 108 may use the variable power source generated from RF waves 104 to power up electronic components within receiver 108 for proper operation.

Receiver 108 may be integrated in electronic device 110 and may include a housing (not shown in FIG. 3) that can be made of any suitable material to allow for signal or wave transmission and/or reception, for example plastic or hard rubber. This housing may be an external hardware that may be added to different electronic equipment, for example in the form of cases, or can be embedded within electronic equipment as well.

Receiver 108 may include an antenna array 302 which may convert RF waves 104 or pockets of energy 106 into electrical power. Antenna array 302 may include one or more antenna elements 304 coupled with one or more rectifiers 306. RF waves 104 may exhibit a sinusoidal shape within a voltage amplitude and power range that may depend on characteristics of transmitter 102 and the environment of transmission. The environment of transmission may be affected by changes to or movement of objects within the physical boundaries, or movement of the boundaries themselves. It is also affected by changes to the medium of transmission; for example, changes to air temperature or humidity. As a result, the voltage or power generated by antenna array 302 at the receiver 108 may be variable. As an illustrative embodiment, and not by way of limitation, the alternating current (AC) voltage or power generated by antenna element 304 from RF waves 104 or pocket of energy 106 may vary from about 0 volts or 0 watt to about 5 volts at 3 watts.

Antenna element 304 may include suitable antenna types for operating in frequency bands similar to the bands described for transmitter 102 from FIG. 2. Antenna element 304 may include vertical or horizontal polarization, right hand or left hand polarization, elliptical polarization, or other suitable polarizations as well as suitable polarization combinations. Using multiple polarizations can be beneficial in devices where there may not be a preferred orientation during usage or whose orientation may vary continuously through time, for example electronic device 110. On the contrary, for devices with well-defined orientations, for example a two-handed video game controller, there might be a preferred polarization for antennas which may dictate a ratio for the number of antennas of a given polarization. Suitable antenna types may include patch antennas with heights from about ⅛ inch to about 6 inches and widths from about ⅛ inch to about 6 inches. Patch antennas may have the advantage that polarization may depend on connectivity, i.e. depending on which side the patch is fed, the polarization may change. This may further prove advantageous as receiver 108 may dynamically modify its antenna polarization to optimize wireless power transmission 100.

Rectifier 306 may include diodes or resistors, inductors or capacitors to rectify the AC voltage generated by antenna element 304 to direct current (DC) voltage. Rectifier 306 may be placed as close as is technically possible to antenna element 304 to minimize losses. In one embodiment, rectifier 306 may operate in synchronous mode, in which case rectifier 306 may include switching elements that may improve the efficiency of rectification. As an illustrative embodiment and not by way of limitation input boost converter 308 may operate with input voltages of at least 0.6 volts to about 5 volts to produce an output voltage of about 5 volts. In addition, input boost converter 308 may reduce or eliminate rail-to-rail deviations and may operate as a step-up DC-to-DC converter to increase the voltage from rectifier 306 to a voltage level suitable for proper operation of receiver 108. In one embodiment, intelligent input boost converter 308 may exhibit a synchronous topology to increase power conversion efficiency.

As the voltage or power generated from RF waves 104 may be zero at some instants of wireless power transmission 100, receiver 108 can include a storage element 310 to store energy or electric charge from the output voltage produced by input boost converter 308. In this way, storage element 310 may deliver a constant voltage or power to a load 312 which may represent the battery or internal circuitry of electronic device 110 requiring continuous powering or charging. For example, load 312 may be the battery of a mobile phone requiring constant delivery of 5 volts at 2.5 watts.

Storage element 310 may include a battery 314 to store power or electric charge from the voltage received from input boost converter 308. Battery 314 may be of different types, including but not limited to, alkaline, nickel-cadmium (NiCd), nickel-metal hydride (NiHM), and lithium-ion, among others. Battery 314 may exhibit shapes and dimensions suitable for fitting receiver 108, while charging capacity and cell design of battery 314 may depend on load 312 requirements. For example, for charging or powering a mobile phone, battery 314 may deliver a voltage from about 3 volts to about 4.2 volts.

In another embodiment, storage element 310 may include a capacitor (not shown in FIG. 3) instead of battery 314 for storing and delivering electrical charge or power to load 312. As a way of example, in the case of charging or power a mobile phone, receiver may include a capacitor with operational parameters matching the load device's power requirements.

Receiver 108 may also include an output boost converter 316 operatively coupled with storage element 310 and input boost converter 308, where this output boost converter 316 may be used for matching impedance and power requirements of load 312. As an illustrative embodiment, and not by way of limitation, output boost converter 316 may increase the output voltage of battery 314 from about 3 or 4.2 volts to about 5 volts which may be the voltage required by the battery 314 or internal circuitry of a mobile phone. Similarly to input boost converter 308, output boost converter 316 may be based on a synchronous topology for enhancing power conversion efficiency.

Storage element 310 may provide power or voltage to a communication subsystem 318 which may include a low-dropout regulator (LDO 320), a main system micro-controller 322, and an electrically erasable programmable read-only memory (EEPROM 324). LDO 320 may function as a DC linear voltage regulator to provide a steady voltage suitable for low energy applications as in main system micro-controller 322. Main system micro-controller 322 may be operatively coupled with EEPROM 324 to store data pertaining the operation and monitoring of receiver 108. Main system micro-controller 322 may also include a clock (CLK) input and general purpose inputs/outputs (GPIOs).

In one embodiment, intelligent input boost converter 308 may include a built-in micro-controller (not shown in FIG. 3) operatively coupled with a main system micro-controller 322. The main system micro-controller 322 may actively monitor the overall operation of receiver 108 by taking one or more power measurements 326 (ADC) at different nodes or sections as shown in FIG. 3. For example, main system micro-controller 322 may measure how much voltage or power is being delivered at rectifier 306, input boost converter 308, battery 314, output boost converter 316, communication subsystem 318, and/or load 312. Main system micro-controller 322 may communicate these power measurements 326 to load 312 so that electronic device 110 may know how much power it can pull from receiver 108. In another embodiment, main system micro-controller 322, based on power measurements 326, may control the power or voltage delivered at load 312 by adjusting the load current limits at output boost converter 316.

Main system micro-controller 322 may monitor the voltage levels at the output of the main antenna array 302 using ADC node point 307.

In another embodiment, main system micro-controller 322 may regulate how power or energy can be drained from storage element 310 based on the monitoring of power measurements 326. For example, if the power or voltage at input boost converter 308 runs too low, then main system micro-controller 322 may direct output boost converter 316 to drain battery 314 for powering load 312.

Yet in another embodiment, receiver 108 may have a dedicated antenna element 330 operatively coupled with a corresponding rectifier 332, where these dedicated antenna element 330 and rectifier 332 may be used for continuously monitoring the surrounding pocket of energy 106. This dedicated antenna element 330 may be separate from the main antenna array 302. More specifically, the main system micro-controller 322 may measure power level at ADC node point 334 to compare against actual DC power levels extracted from the receiver 108 system.

Receiver 108 may include a switch 328 for resuming or interrupting power being delivered at load 312. In one embodiment, main system micro-controller 322 may control the operation of switch 328 according to terms of services contracted by one or more users of wireless power transmission 100 or according to administrator policies.

Figure 4:
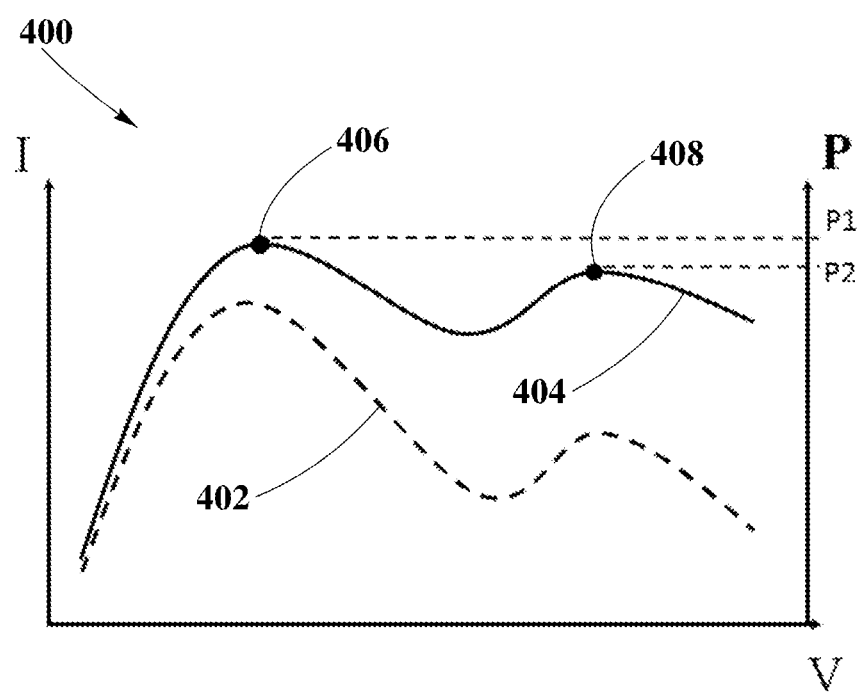
FIG. 4 illustrates the MPPT of characteristic curves, which may be used to change the voltage direction and adjust the operation of the receiver, according to an embodiment.

FIG. 4 illustrates a graph 400, depicting the intensity (I) of current available from main antenna array, (P) the power available from main antenna array, and (V) the voltage from main antenna array. FIG. 4 shows a current-to-voltage curve 402 that may be obtained from receiver 108 operation and which may vary according to the characteristics of receiver 108. FIG. 4 also shows a corresponding power curve 404 which may represent the power available (current×voltage) from the main antenna array 302.

In one embodiment, voltage levels measured at ADC node point 307 may not necessarily exhibit a linear relationship with the available current from the main antenna array 302. Thus, power curve 404 may have multiple local peaks, including a global power maximum 406 at P1, and a local power maximum 408 at P2.

The MPPT algorithm running in the input boost converter 308 may continuously track for a global power maximum 406 in graph 400, so that input boost converter 308 may be able to extract the maximum amount of power from antenna array 302. However, in some circumstances, the MPPT algorithm may be stuck at a local power maximum 408 which may not correspond to the global power maximum 406 in graph 400. When operating at a local power maximum 408, intelligent input boost converter 308 may not be able to maximize the amount of power that can be extracted from antenna array 302.

It may be an object of embodiments described herein to adjust the MPPT algorithm to control the operation of intelligent input boost converter 308 so that it can continuously operate at global power maximum 406 to make the best use of the power that can be extracted from antenna array 302 in receiver 108 system.

Figure 5:
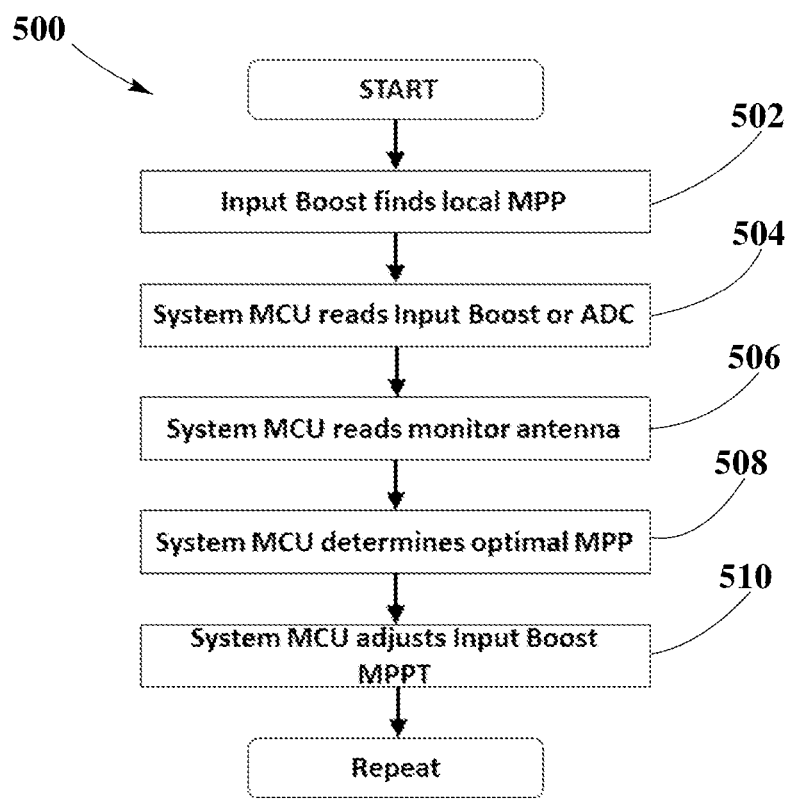
FIG. 5 shows a flowchart for the method enabled by the proprietary MPPT algorithm controlling maximum power point transfer and operation of the input boost converter, according to an embodiment.

FIG. 5 shows a MPPT management method 500 that may be used for maximizing the amount of power that can be extracted from antenna array 302 to deliver continuous and suitable power to receiver 108.

At monitoring step 502, the built-in micro-controller in the intelligent input boost converter 308 may monitor voltage from antenna array 302 and search for a global power maximum 406 or local power maximum 408.

At step 504, the main system micro-controller 322 may read the result from the input boost converter 308 or use ADC node point 307 to establish the input boost converter 308 current operational MPPT. Subsequently, at step 506, the main system micro-controller 322 may read the voltage of dedicated antenna element 330 at ADC node point 334. At step 508, the combination of the input boost converter 308 MPP and the output value of dedicated antenna element 330 may be used to either index a predefined look-up table or be used in an algorithm. This result may or may not require an adjustment of the operational input parameters of the input boost converter 308 MPPT algorithm. Once action is determined, the main system micro-controller 322 may adjust the MPPT algorithm executed by input boost converter 308, thus moving the operation of input boost converter 308 from local power maximum 408 P2 to global power maximum 406 P1, at step 510.

The predefined MPPT tables may include a characterization of a plurality of receivers 108 in terms of ability to extract power from a particular field. For example, the capability of receiver 108 for extracting power from RF waves 104 may vary according to the configuration of antenna array 302. In one embodiment, these MPPT tables may be determined by laboratory measurements of different receivers 108 in a way that a particular receiver 108 may be mapped to an optimal MPPT.

In one embodiment, main system micro-controller 322 may use the information contained in MPPT tables to provide initial conditions for running an optimal MPPT at intelligent input boost converter 308 according to the specific characteristics or configuration of receiver 108.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A receiver comprising:
   a first antenna element configured to receive a first wireless signal comprising a first energy resulting from a first constructive interference pattern of a first plurality of wireless power transmission waves;
   a first rectifier coupled to the first antenna element, wherein the first rectifier is configured to rectify the first energy received by the first antenna element;
   a second antenna element configured to receive a second wireless signal comprising a second energy resulting from a second constructive interference pattern of a second plurality of wireless power transmission signal waves;
   a second rectifier coupled to the second antenna element, wherein the second rectifier is configured to rectify the second energy received by the second antenna element;
   an input boost converter coupled to the first rectifier, wherein the input boost converter is configured to step up the first energy rectified by the first rectifier, wherein the input boost converter is configured to determine at least one of a global power maximum and a local power maximum produced in the first rectifier; and
   a controller coupled to the input boost converter and the second rectifier, wherein the controller is configured to determine an available energy at the second rectifier based on the second energy, wherein the controller is configured to determine a maximum power point (MPP) value from the first rectifier via the input boost converter, wherein the controller is configured to transmit an operational instruction to the input boost converter to further step up the first energy rectified by the first rectifier.

2. The receiver of claim 1, wherein the input boost converter comprises a second controller coupled to the controller.

3. The receiver of claim 1, wherein the operational instruction comprises data to configure the input boost converter to further step up the first energy rectified by the first rectifier to the global power maximum.

4. The receiver of claim 1, wherein the controller is configured to index the available energy and the MPP value in a look-up table.

5. The receiver of claim 1, wherein the controller is configured to compare the available energy to the MPP value and determine the operational instruction thereby.

6. The receiver of claim 1, further comprising:
   an output boost converter, wherein the controller is configured to determine a load requirement for the receiver, and wherein the controller is configured to control an operation of at least one of the input boost converter and the output boost converter based on the load requirement.

7. The receiver of claim 1, further comprising:
   a storage element coupled to the input boost converter, wherein the storage element is configured to store at least a portion of the first energy as rectified by the first rectifier, input into the input boost converter, and output from the input boost converter.

8. The receiver of claim 1, further comprising a communication component, an output boost converter, and a storage element coupled to the output boost converter, wherein the controller is configured to obtain a measurement of a voltage from at least one of the first rectifier, the input boost converter, the storage element, and the output boost converter, and wherein the controller is configured to communicate the measurement to a load via the communication component.

9. The receiver of claim 1, further comprising an output boost converter, wherein the controller is configured to control an operation of the output boost converter by adjusting a load current limit at the output boost converter.

10. A method of receiver operation, the method comprising:
receiving, by a first antenna element of a receiver, a first wireless signal comprising a first energy resulting from a first constructive interference pattern of a first plurality of wireless power transmission waves;
rectifying, by a first rectifier of the receiver, the first energy received by the first antenna element;
receiving, by a second antenna element of the receiver, a second wireless signal comprising a second energy resulting from a second constructive interference pattern of a second plurality of wireless power transmission signal waves;
rectifying, by a second rectifier of the receiver, the second energy received by the second antenna element;
stepping up, by an input boost converter of the receiver, the first energy rectified by the first rectifier;
determining, by the input boost converter of the receiver, at least one of a global power maximum and a local power maximum produced in the first rectifier;
determining, by a controller of the receiver, an available energy at the second rectifier based on the second energy;
determining, by the controller of the receiver, a maximum power point (MPP) value from the first rectifier via the input boost converter; and
transmitting, by the controller of the receiver, an operational instruction to the input boost converter to further step up the first energy rectified by the first rectifier.

11. The method of claim 10, wherein the input boost converter comprises a second controller coupled to the controller.

12. The method of claim 10, wherein the operational instruction comprises data to configure the input boost converter to further step up the first energy rectified by the first rectifier to the global power maximum.

13. The method of claim 10, further comprising:
indexing, by the controller of the receiver, the available energy and the MPP value in a look-up table.

14. The method of claim 10, further comprising:
comparing, by the controller of the receiver, the available energy to the MPP value; and determining, by the controller of the receiver, the operational instruction based on the comparing.

15. A receiver comprising:
a plurality of antenna elements configured to receive a wireless signal comprising energy resulting from a constructive interference pattern of a plurality of wireless power transmission signal waves;
a plurality of rectifiers corresponding to the antenna elements and configured to rectify the energy received by the antenna elements, wherein the rectifiers comprising a first rectifier and a second rectifier;
an input boost converter coupled to the first rectifier and configured to step up the energy rectified by the first rectifier, wherein the input boost converter is further configured to determine at least one of a global power maximum and a local power maximum produced in the first rectifier; and
a controller coupled to the input boost converter and the second rectifier and configured to determine an available energy at the second rectifier, wherein the controller is further configured to determine a maximum power point (MPP) value from the first rectifier via the input boost converter, and wherein the controller is further configured to transmit an operational instruction to the input boost converter to further step up the energy rectified by the first rectifier.

16. The unit of claim 15, wherein the input boost converter comprises a second controller coupled to the controller.

17. The unit of claim 15, wherein the operational instruction comprises data to configure the input boost converter to further step up the energy rectified by the first rectifier to the global power maximum.

18. The unit of claim 15, wherein the controller is configured to index the available energy and the MPP value in a look-up table.

19. The unit of claim 15, wherein the controller is configured to compare the available energy to the at MPP value and determine the operational instruction thereby.

20. The unit of claim 15, wherein the receiver further comprising:
an output boost converter, wherein the controller is configured to determine a load requirement for the receiver, wherein the controller is configured to control an operation of at least one of the input boost converter and the output boost converter based on the load requirement.

* * * * *